United States Patent
Arai et al.

(10) Patent No.: US 11,405,276 B2
(45) Date of Patent: Aug. 2, 2022

(54) DEVICE CONFIGURATION MANAGEMENT APPARATUS, SYSTEM, AND PROGRAM

(71) Applicant: Yokogawa Electric Corporation, Tokyo (JP)

(72) Inventors: Takashi Arai, Tokyo (JP); Yusaku Yoshida, Tokyo (JP); Shuichi Sato, Tokyo (JP); Hiroo Urabe, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 248 days.

(21) Appl. No.: 16/502,496

(22) Filed: Jul. 3, 2019

(65) Prior Publication Data

US 2020/0014595 A1 Jan. 9, 2020

(30) Foreign Application Priority Data

Jul. 6, 2018 (JP) .............................. JP2018-129189

(51) Int. Cl.
*H04L 41/0853* (2022.01)
*H04L 41/22* (2022.01)

(52) U.S. Cl.
CPC .......... *H04L 41/0853* (2013.01); *H04L 41/22* (2013.01)

(58) Field of Classification Search
CPC ............................ H04L 41/0853; H04L 41/22
USPC ....................................................... 709/223
See application file for complete search history.

(56) References Cited

U.S. PATENT DOCUMENTS

| | | | |
|---|---|---|---|
| 2003/0004987 A1 | 1/2003 | Glanzer et al. | |
| 2003/0041142 A1* | 2/2003 | Zhang | H04L 41/22 709/224 |
| 2006/0259604 A1* | 11/2006 | Kotchavi | H04L 41/082 709/223 |
| 2009/0132543 A1* | 5/2009 | Chatley | G06F 16/185 |
| 2009/0171976 A1 | 7/2009 | Obara et al. | |
| 2009/0225663 A1 | 9/2009 | Kaiduka | |
| 2012/0089713 A1* | 4/2012 | Carriere | H04L 61/609 709/222 |
| 2012/0197852 A1* | 8/2012 | Dutta | H04L 67/12 707/692 |
| 2012/0266073 A1* | 10/2012 | Tanaka | G06F 11/3065 715/736 |
| 2013/0211546 A1 | 8/2013 | Lawson et al. | |

(Continued)

FOREIGN PATENT DOCUMENTS

| | | |
|---|---|---|
| GB | 2552419 A | 1/2018 |
| JP | 2006-285632 A | 10/2006 |
| JP | 2018-14105 A | 1/2018 |

*Primary Examiner* — Meng Vang
(74) *Attorney, Agent, or Firm* — Sughrue Mion, PLLC

(57) ABSTRACT

A device configuration management apparatus includes a logical node information storage storing logical node information about a logical node that can be associated with a particular device and a particular location, the logical node information including for each of logical nodes a device ID for identifying the particular device and location information which is information for identifying the location, a network information storage storing network information as a set of information about an edge connecting two logical nodes, and a node update processer configured to perform processing for updating at least one of the device ID and the location information with regard to the particular logical node in the logical node information stored in the logical node information storage.

16 Claims, 5 Drawing Sheets

(56) References Cited

U.S. PATENT DOCUMENTS

2014/0067091 A1 3/2014 Vishwanath et al.
2017/0302530 A1* 10/2017 Wolting ................ H04L 41/145
2017/0357245 A1 12/2017 Nikhra et al.

* cited by examiner

FIG. 3

LOGICAL NODE INFORMATION STORAGE

| LOGICAL NODE ID | LOGICAL NODE NAME | POSITION | DEVICE ID | ADMINISTRATIVE USER |
|---|---|---|---|---|
| N1004001 | MY CLOUD | LONG. 140° 15' 21" E<br>LAT. 35° 40' 30" N | GS370-4W  100341 | M000011 |
| N1004002 | OFFICE | LONG. 140° 15' 23" E<br>LAT. 35° 40' 30" N | MTGW003B  3216666 | M000011 |
| N1004003 | WATER LEVEL SENSOR A | LONG. 140° 15' 22" E<br>LAT. 35° 40' 28" N | YLVM-110  54330021 | M000820 |
| N1004004 | WATER LEVEL SENSOR B | LONG. 140° 15' 24" E<br>LAT. 35° 40' 28" N | YLVM-110  54330022 | M000820 |
|  |  |  |  |  |

FIG. 4

DEVICE INFORMATION STORAGE

| DEVICE ID | | VENDOR | DEVICE NAME | ASSET NUMBER |
|---|---|---|---|---|
| MODEL NUMBER | SERIAL NUMBER | | | |
| GS370-4W | 100341 | COMPANY A | GrandSight | AS2017-00012345 |
| MTGW003B | 3216666 | COMPANY B | Multi-tech-GW | AS2015-00004444 |
| YLVM-110 | 54330021 | COMPANY Y | YGW WATER LEVEL GAUGE | AS2018-00000101 |
| YLVM-110 | 54330022 | COMPANY Y | YGW WATER LEVEL GAUGE | AS2018-00000102 |
|  |  |  |  |  |

FIG. 5

NETWORK INFORMATION STORAGE

| EDGE ID | START POINT NODE | END POINT NODE | COMMUNICATION TYPE |
|---|---|---|---|
| E00121 | N1004001 | N1004002 | WIRED COMMUNICATION |
| E00122 | N1004002 | N1004003 | WIRELESS COMMUNICATION |
| E00123 | N1004002 | N1004004 | WIRELESS COMMUNICATION |
|  |  |  |  |

DEVICE CONFIGURATION MANAGEMENT APPARATUS, SYSTEM, AND PROGRAM

BACKGROUND

Technical Fields

The present invention relates to a device configuration management apparatus, system, and program.

The present application claims priority based on Japanese Patent Application No. 2018-129189, filed on Jul. 6, 2018, the content of which is incorporated herein by reference.

Related Art

There is a technique for an information system for managing a large number of devices that constitute large-scale industrial facilities (for example, a chemical plant). In related art, information about a management target device has been stored in storage means in the device and used for management. At that time, identification information for identifying the individual device has been used as a key. Also, since in industrial facilities, specific functions are provided at specific locations, it is also considered to manage information about devices using location information representing a particular location as a key, instead of identification information that identifies an individual device.

Japanese Patent Laid-Open No. 2006-285632 describes techniques for managing maintenance target devices. In Japanese Patent Laid-Open No. 2006-285632, for example, claim 1 describes a configuration for managing maintenance work and the like of the devices by using data having device identification information for identifying the device as a key.

Japanese Patent Laid-Open No. 2018-014105 describes a technique of a tool for maintaining field devices in a process control system. The technique described in Japanese Patent Laid-Open No. 2018-014105 uses a field device identifier (also referred to as "identification of a device", "tag of a device", or "field device ID") for identifying a maintenance target field device (e.g., paragraph 0142, paragraph 0147, etc.)

Even if device information is managed using device identification information or location information (or location identification information) as a key, desired information management may not be realized in certain cases.

For example, when device information is managed using device identification information as a key, and in a case where devices are updated, for example, due to aging, it used to be impossible to associate and grasp device identification information about pre-update devices and device identification information about post-update devices. When such a situation occurs, there may arise a problem in that it is not possible to perform management of devices by integrally grasping the pre-update devices and the post-update devices.

Also, for example, when information about a device is managed using information representing location as a key (referred to as location information), and, for example, when devices are relocated to another location by reviewing the arrangement of equipment in a facility, etc. there may arise a situation in that it is not possible to associate and grasp the devices before and after the change of their locations. Even in this situation, there may be a problem in that the devices cannot be managed consistently over a long time.

The present invention is made in view of the above problems, and, it is an object of the present invention to provide, for example, a device configuration management apparatus, system, and program that can manage a configuration of devices in a desirable and consistent manner over a long period of time, even when a device is replaced by another device due to updating caused by aging of the device, etc., or when the location of a device is changed due to review and the like of arrangement of the devices.

SUMMARY

A device configuration management apparatus according to an aspect of the present invention includes a logical node information storage storing logical node information about a logical node that can be associated with a particular device and a particular location, the logical node information including for each of logical nodes a device ID for identifying the particular device and location information which is information for identifying the location, a network information storage storing network information as a set of information about an edge connecting two logical nodes, and a node update processer configured to perform processing for updating at least one of the device ID and the location information with regard to the particular logical node in the logical node information stored in the logical node information storage.

Further features and aspects of the present disclosure will become apparent from the following detailed description of exemplary embodiment with reference to the attached drawings.

BRIEF DESCRIPTION OF THE DRAWINGS

FIG. 3 is a schematic view illustrating a configuration of data stored in a logical node information storage according to the embodiment.

FIG. 4 is a schematic illustrating a configuration of data stored in a device information storage according to the embodiment.

FIG. 5 is a schematic illustrating a configuration of data stored in the network information storage according to the embodiment.

DETAILED DESCRIPTION OF THE EMBODIMENTS

An embodiment of the present invention will be described with reference to the preferred embodiment. A person skilled in the art can achieve many alternatives to the present embodiment using the teachings of the present invention, and the present invention is not limited to the preferred embodiment described herein.

One aspect of the present invention is to provide a device configuration management apparatus for managing a plurality of devices in association with logical nodes.

The logical node is a key concept to manage the device in this embodiment. The logical node corresponds to a management target in a system consisting of a large number of devices. The logical node is rigidly tied to a location, but is not the same concept as a location. Any given logical node is associated with any given location for a long time, but the location of the logical node is not invariant. The location attached to the logical node may change not so frequently. The logical node itself, the ID for identifying the logical node, and the name of the logical node may be referred to as "tag".

Also, although any given logical node is connected to any given device (individual device) for a long time, the connection between the logical node and the device is not invariable.

In the present embodiment, the device configuration management apparatus manages logical nodes and stores location information associated with the logical nodes. Also, the device configuration management apparatus stores information about the device associated with the logical node. Also, the device configuration management apparatus can update information about the location managed in association with the logical node. Also, the device configuration management apparatus can update information about the device managed in association with the logical node. As an aspect for that purpose, the device configuration management apparatus treats logical nodes as objects, and manages information about the location and the device as attributes of the logical node. In a relational data model, logical nodes correspond to rows of a table data, and the location and the device respectively correspond to columns (digits) in the table data.

Figure 1:
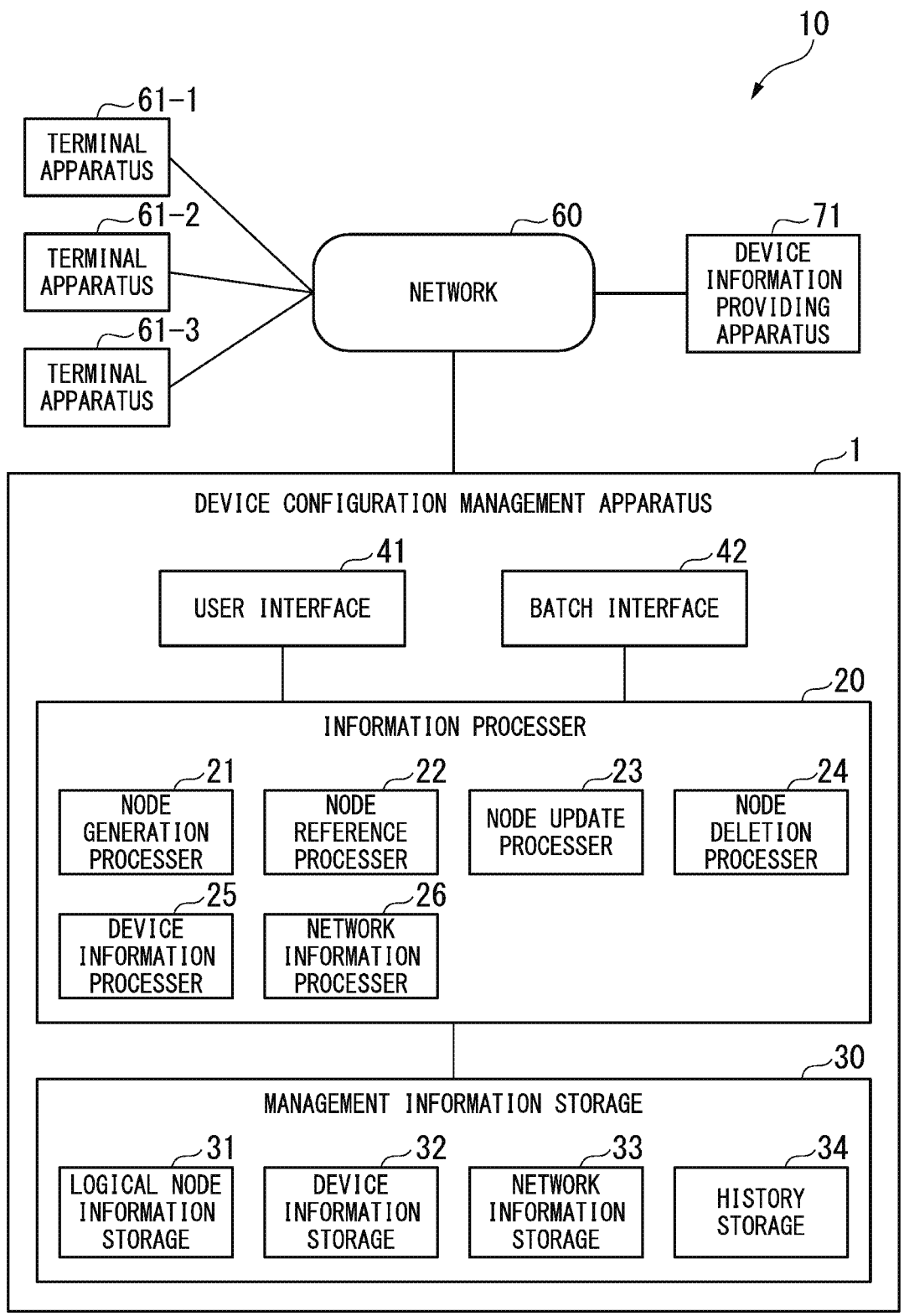
FIG. 1 is a block diagram illustrating a functional configuration of a device configuration management system according to an embodiment of the present invention.

FIG. 1 is a block diagram illustrating a functional configuration of a device configuration management system according to an embodiment of the present invention.

As illustrated, the device configuration management system 10 includes a device configuration management apparatus 1, terminals apparatus 61, 61-1, 61-2, 61-3, ..., and a device information providing apparatus 71. In the device configuration management system 10, each apparatus is connected by a network 60 so that each apparatus can communicate with each other. Although FIG. 1 illustrates three terminals apparatuses as an example, the number of terminal apparatuses is arbitrary. The terminal apparatuses 61-1, 61-2, 61-3, etc. may be simply referred to as terminal apparatuses 61.

Each of these functional units is realized, for example, using an electronic circuit. In addition, each functional unit may be internally provided with storage means such as a semiconductor memory or a magnetic hard disk apparatus, as required. In addition, each function may be realized by a computer and software.

The device configuration management apparatus 1 is an apparatus for managing configuration of devices (field device etc.) and networks formed by connecting devices. The device configuration management apparatus 1 is realized by using a server type computer as an example. The more detailed function configuration of the device configuration management apparatus 1 will be described later.

The terminal apparatus 61 is an apparatus used by users who manage devices. When viewed as a client and server model, the terminal apparatus 61 is a client whereas the device configuration management apparatus 1 is a server. The terminal apparatus 61 can be realized, for example, using a desktop or notebook PC (personal computer), a tablet terminal apparatus, a smartphone (smartphone), a wearable computer, or the like.

The device information providing apparatus 71 is an apparatus for collectively providing information about devices (field devices etc.) to the device configuration management apparatus 1. The device information providing apparatus 71 is realized, for example, using various computers. In a typical case, the device information providing apparatus 71 is operated by a vendor of the device or operated as a purchasing system of the company purchasing the device. The device information providing apparatus 71 provides, for example, information about models, information about serial numbers, etc. of a large number of devices purchased by a company. The device information providing apparatus 71 provides such information, so that the device configuration management apparatus 1 can obtain information about the devices (details will be described later) with less effort.

The network 60 is a network for enabling apparatuses such as the device configuration management apparatus 1, the terminal apparatus 61, and the device information providing apparatus 71 to communicate with each other. The network 60 is, for example, a network using an IP (Internet Protocol).

The network 60 may be a so-called cloud network. That is, a server such as the device configuration management apparatus 1 may be a so-called cloud server.

As illustrated, the device configuration management apparatus 1 includes an information processer 20, a management information storage 30, a user interface 41, and a batch interface 42.

The information processer 20 has a function to process data. The information processer 20 mainly processes data stored in the management information storage 30. The details of the information processer 20 will be described later.

The management information storage 30 stores data for managing devices, networks, logical nodes, etc. The management information storage 30 is provided with information storage means such as, for example, a magnetic hard disk apparatus or a semiconductor memory. The details of the management information storage 30 will be described later.

The user interface 41 performs processing related to the user interface. Specifically, the user interface 41 displays information on the terminal apparatus 61, and obtains information from the terminal apparatus 61. Also, the user interface 41 processes the data in the management information storage 30 by calling functions in the information processer 20 as necessary in order to realize the user interface.

In other words, the user interface 41 provides the external terminal apparatus 61 with a user interface that enables generation, update, or deletion of data stored in the logical node information storage 31, the network information storage 33, and the device information storage 32.

In addition, in cooperation processing with field device 62 and the terminal apparatus 61 described later (see FIG. 8), when the user interface 41 receives a particular signal by communication from an external device (field device 62 etc.), the user interface 41 headlights, on the display screen 61, the information about the device which is the transmission source of the particular signal.

The batch interface 42 has an interface function for batch processing of data. Specifically, the batch interface 42 receives data for batch processing from the device information providing apparatus 71, and instructs the device information processer 25 to execute the batch processing. As a result, the device information processer 25 can perform batch processing based on the data obtained from the device information providing apparatus 71. With regard to batch processing of data, no operation is performed at terminal apparatus 61 regarding the content of the data for each case. Thus, instead of the user interface 41, the batch interface 42 plays the role of an interface with the outside for batch processing. A typical example of data batch processing is processing to add data to the device information storage 32 for multiple new devices. However, the batch processing of data is not limited to generation of new data (insertion of data), and batch update of data on existing devices or batch deletion of data on existing devices may be performed.

The batch interface 42 processes data in the management information storage 30 by calling functions in the information processer 20 as necessary to realize a target function.

The more detailed function configuration of the information processer 20 is as follows. The information processer 20 includes a node generation processer 21, a node reference processer 22, a node update processer 23, a node deletion processer 24, a device information processer 25, and a network information processer 26.

The node generation processer 21 performs processing to add data of a newly generated node in the logical node information storage 31.

The node reference processer 22 performs processing of referring to data of a node in the logical node information storage 31.

The node update processer 23 performs processing of updating data of a node in the logical node information storage 31. Particularly, the node update processer 23 performs processing of updating at least one of the device ID and the location information regarding a particular logical node in the logical node information stored in the logical node information storage 31.

The node deletion processer 24 performs processing of deleting data of a particular node in logical node information storage 31.

The device information processer 25 performs processing (data insertion, reference, update, deletion, etc.) regarding data stored in the device information storage 32.

The network information processer 26 performs processing (data insertion, reference, update, deletion, etc.) regarding data stored in the network information storage 33.

The more detailed configuration of the management information storage 30 is as follows. The management information storage 30 includes a logical node information storage 31, a device information storage 32, a network information storage 33, and a history storage 34.

The logical node information storage 31 stores data of logical nodes. The logical node itself is as described above.

The logical node information storage 31 is logical node information about a logical node that can be associated with a particular device and a particular location, wherein the logical node information includes, for each of the logical nodes, a device ID for identifying the particular device and location information for identifying the location.

More specific data configuration of the logical node information storage 31 will be described later with reference to another drawing.

The device information storage 32 stores data of device. In other words, the device information storage 32 stores information about a device in association with identification information (device ID) for uniquely identifying the device. The data configuration of the device information storage 32 will be described later with reference to another drawing.

The network information storage 33 stores data of the configuration of the network connecting logical nodes. A network can be expressed as information about a set of edges connecting logical nodes. That is, the network information storage 33 stores data about the edges.

That is, the network information storage 33 stores network information as a set of information about edges connecting two logical nodes. The data configuration of the network information storage 33 will be described later with reference to another drawing.

The history storage 34 stores information about the history of data of the logical node information storage 31, the device information storage 32, and the network information storage 33. More specifically, for example, when the logical node information storage 31, the device information storage 32, and the network information storage 33 are rewritten, the updated contents of the data are written in the history storage 34. As will be described later, each of the logical node information storage 31, the device information storage 32, and the network information storage 33 can be expressed as data of a table based on a relational data model. The history storage 34 holds the data of the contents of an added row when adding (inserting) a row to the table. In addition, with regard to the update of a row included in the table, the history storage 34 holds data of a set of values before and after the update of the item to be updated. Also, with regard to deletion of a row included in the table, the history storage 34 holds information (for example, information on primary keys) that uniquely identifies a row to be updated. Also, with regard to deletion of a row, the history storage 34 may hold data of a value of each item before deletion.

The form of the history storage 34 exemplified here is an example. The history storage 34 may hold other forms of data, as long as the information is sufficient to trace the history of changes of data.

Figure 2:
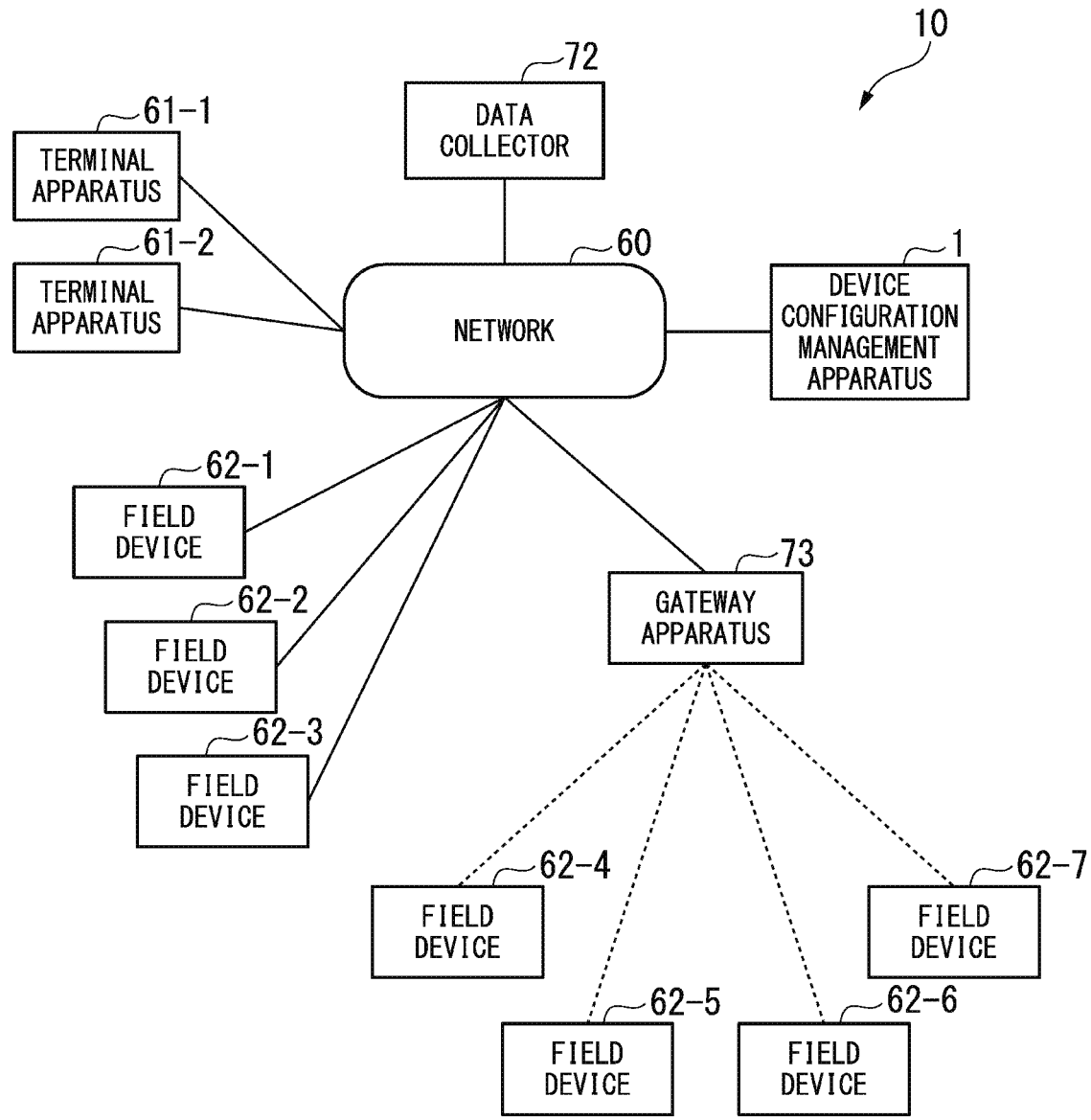
FIG. 2 is a functional block diagram illustrating a relationship between the device configuration management apparatus and field devices and the like according to the embodiment.

FIG. 2 is a functional block diagram illustrating a relationship between the device configuration management apparatus and field devices and the like. As already described in FIG. 1, the device configuration management apparatus 1 can communicate with the terminal apparatus 61 via the network 60. Also, the device configuration management apparatus 1 can communicate with the field devices 62-1 to 62-7, etc. via the network 60. The field device 62 is, for example, a device such as a sensor or an actuator used for process control. Although a total of seven fields device 62 are shown in the figure, the number of devices in field device 62 contained in system is arbitrary. For example, the device configuration management system 10 may include several thousand or more field devices 62. Of the field devices 62 illustrated, the field devices 62-1 to 62-3 are each connected to the network 60 by wired communication. The field devices 62-4 to 62-7 are connected by wireless communication to the network 60 via the gateway apparatus 73. The gateway apparatus 73 has a function of relaying communication with an apparatus such as the field device 62 using wireless communication. Thus, each of the field devices 62-1 to 62-7 can communicate with the device configuration management apparatus 1 and the data collection apparatus 72 via the network 60.

The field device 62 is, for example, an actuator for receiving a command from the control apparatus (not shown) via the network 60 to control a process in an industrial facility or the like. Alternatively, the field device 62 is, for example, a sensor installed at a predetermined place in an industrial facility or the like to detect a physical phenomenon or measure a physical quantity. The sensors are, for example, devices such as flowmeters, voltmeters, ammeters, thermometers, hygrometers, and pressure gauges. The sensor transmits a signal corresponding to the detected physical phenomenon or the measured physical quantity to another apparatus via the network 60. For example, the sensors send their signals (which may be digitized) to the data acquisition apparatus 72. The field device 62 will also be simply referred to as a "device".

The data collection apparatus 72 receives and accumulates data (the above-mentioned "signal") from the field device 62. The data collected by the data collected by the apparatus 72 are used for process control, etc.

The gateway apparatus 73 transmits information received from the field devices 62-4 to 62-7 by wireless or wired communication to the apparatuses etc. on the network 60 by wired communication. Conversely, the gateway apparatus 73 transmits information received from the apparatus or the like on the network 60 by wired communication to the field devices 62-4 to 62-7 by wireless communication. That is, the gateway apparatus 73 functions as a gateway between the wireless communication and the network 60.

Next, the configuration etc. of the main data among the data stored in the management information storage 30 will be described.

FIG. 3 is a schematic view illustrating a configuration of data stored in the logical node information storage 31. As illustrated, the logical node information storage 31 stores tabular data as an example. This table contains items such as logical node ID, logical node name, location, device ID, and administrator user. One row of data in this table corresponds to one logical node. The logical node ID is identification information for uniquely identifying the logical node. The logical node ID is a primary key in the data of this table. The logical node name is a name given to the logical node as appropriate. The location is the location of the logical node or the device (apparatus) etc. associated with the logical node. The location is expressed, for example, by longitude and latitude. The administrator user is identification information for identifying the user who manages the relevant logical node.

In the illustrated example, data (table) stored in the logical node information storage 31 includes data of logical nodes whose logical node IDs are "N1004001", "N1004002", "N1004003", and "N1004004", respectively.

FIG. 4 is a schematic illustrating a configuration of data stored in the device information storage 32. As illustrated, the device information storage 32 stores tabular data as an example. This table contains items such as device ID, vendor, device name, and asset number. One row of data in this table corresponds to one device. The device ID is identification information for uniquely identifying an individual device. The device ID according to the present embodiment is configured as a combination of a model number and a serial number. The device ID is a primary key in the data in this table. The vendor is the name of the vendor that manufactures or sells the device. The device name is a name given appropriately to the device. The asset number is the number assigned to the device. As the asset number, for example, a number managed in the asset management register as an asset owned by a company is used.

In the illustrated example, the data (table) stored in the device information storage 32 includes data of devices having the device IDs listed below.

(1) Model number: GS370-4W, serial number: 100341
(2) Model number: MTGW003B, serial number: 3216666
(3) Model number: YLVM-110, serial number: 54330021
(4) Model number: YLVM-110, serial number: 54330022

FIG. 5 is a schematic illustrating a configuration of data stored in the network information storage 33. As illustrated, the device information storage 32 stores tabular data as an example. This table contains items such as edge ID, start point node, end point node, and communication type. One row of data in this table corresponds to one edge that constitutes the network. An edge is a link between a node and a node. The edge ID is identification information for uniquely identifying an edge. The edge ID is a primary key in the data of this table. The start node is the logical node ID of a logical node that is the start point of the edge. The end point node is the logical node ID of a logical node that is the end point of the edge. The communication type is information (for example, wireless communication, wired communication, etc.) indicating the type of communication corresponding to the edge.

In the illustrated example, data (table) stored in the network information storage 33 includes data of an edge whose edge ID is "E00121", "E00122", and "E00123", respectively.

Figure 6:
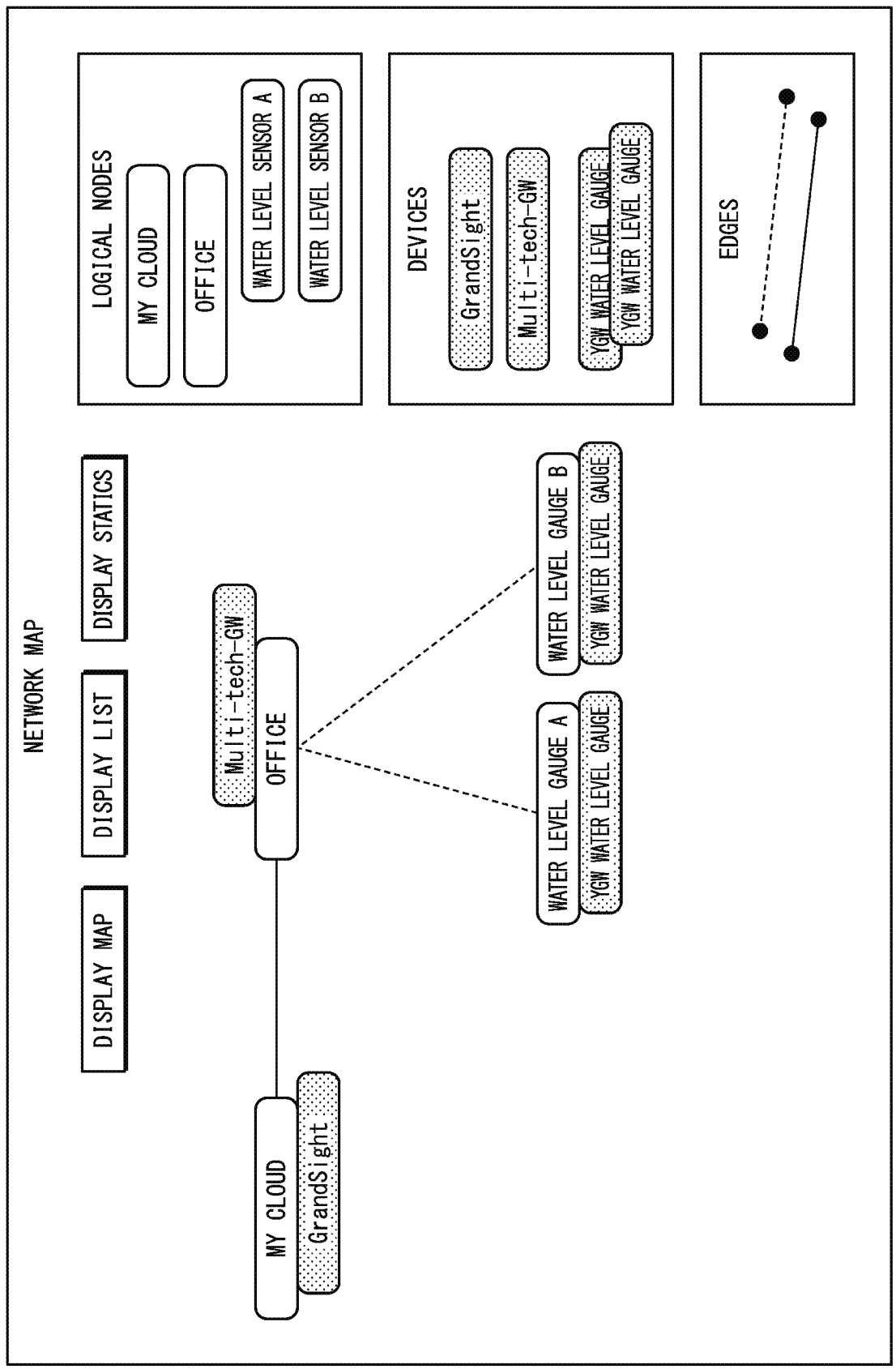
FIG. 6 is an example of a user interface displayed on a screen of a terminal apparatus according to the embodiment.

FIG. 6 is an example of a user interface displayed on a screen of the terminal apparatus 61.

This screen graphically displays the network constituted by connecting logical nodes and the device information associated with each logical node. The way of displaying this screen is called network map. The buttons "Map Display", "List Display" and "Statistic Display" at the top of this screen can be pressed. Here, "press" is, for example, an operation of clicking a button with a pointing device such as a mouse, or touching the surface of a touch panel screen with a finger or a touch pen. When the button "Display map" is clicked, the network map is displayed on the screen. When the button "Display list" is clicked, the screen displays, in the form of a table, a list of logical nodes, a list of devices, and a list of edges constituting a network. When the button "View Statistics" is clicked, the statistical information held by the device configuration management apparatus 1 is displayed. The statistical information displayed is, for example, statistics about the age of a device, the frequency of device failure, and the history of traffic of an edge on the network. The device configuration management apparatus 1 calculates statistical information by performing statistical processing based on, for example, information held by the device configuration management apparatus 1 itself and information received from another apparatus, etc.

In the network map shown in FIG. 6, figures that are not hatched represent logical nodes. Specifically, figures corresponding to logical nodes with the names "MY Cloud", "Office", "Water Level Sensor A", and "Water Level Sensor B" are shown in the network map. Also, the hatched figures represent devices. Specifically, figures corresponding to devices with the name "GrandSight" and "Multi-tech-GW", and two devices with the name "YGW water gauge" are shown in the network map. The device "GrandSight" is, for example, a cloud server apparatus (computer) having a function of collecting data transmitted from a large number of sensors (for example, the device "GrandSight" corresponds to the data collection apparatus 72 described in FIG. 2). The device "Multi-tech-GW" is a gateway "apparatus" for connecting (relaying) performs wireless communication to a wired communication network (for example, the device "Multi-tech-GW" corresponds to the gateway "apparatus 73" described in FIG. 2). In addition, two devices "YGW water level gauges" are water level gauges that have functions to measure the water level and transmit their numerical data. Note that different (individual) devices may have the same name. Each of the above logical nodes is associated with one device. Specifically, the logical node "MY Cloud" is associated with the device "GrandSight". The logical node "Office" is associated with the device "Multi-tech-GW". The logical node "Water level sensor A" is associated with the device "YGW water level gauge". The logical node "water level sensor B" is associated with the device "YGW water level gauge".

Also, three edges are displayed on this network map. The start point node of the first edge is the logical node "My Cloud", and the end point node is the logical node "office". The start point node of the second edge is the logical node "office", and the end point node is the logical node "water level sensor A". The start point node of the third edge is the logical node "office", and the end point node is the logical node "water level sensor B". The first edge is indicated by a solid line. The second and third edges are indicated by dashed lines. In this example, the edge indicated by a solid line indicates that it is wired communication. The edge indicated by the broken line represents that it is wireless communication. However, the relationship between the type of line and the meaning that the line represents does not have to be in the relationship illustrated here, but is arbitrary.

On the right side of the network map, three boxes are illustrated, and the boxes are described with logical nodes, devices, and edges. These boxes are frames that represent partial figures for editing the configuration of the network map. For example, four figures (without hatching) are illustrated in the frame of the logical nodes, and the figures are described with "My Cloud", "Office", "Water level sensor A", and "Water level sensor B". Also, four figures (with hatching) are illustrated in the frame of the devices, and the figures are described with "GrandSight", "Multi-tech-GW", "YGWwater level gauge", and "YGWwater level gauge". Also, in the frame of the edges, figures for two edges are illustrated, one of which is a solid edge and the other is a dashed edge. A user of the terminal apparatus 61 can create or edit a network map while displaying such screen. The terminal apparatus 61 sends data representing the contents of the network map editing operation performed in the terminal apparatus 61 to the device configuration management apparatus 1 at an appropriate timing. The device configuration management apparatus 1 updates data stored in the logical node information storage 31, the device information storage 32, the network information storage 33, and the history storage 34 in the management information storage 30, according to the contents of the operation received from the terminal apparatus 61.

An example of the operation to edit the network map is further described with reference to FIG. 6.

(1) Generation of logical node: A logical node can be newly generated. When a logical node is generated, at least a unique logical node ID is automatically assigned.

Other attribute information of the logical node (see FIG. 3) can be given at the time of generation of the logical node, or it can be set as a "null" value at the time of generation of the logical node. When a logical node is generated, the node creation processer 21 of the device configuration management apparatus 1 inserts data of a new node into the logical node information storage 31.

(2) Updating of logical node: Attribute values of an existing logical node can be updated. Updating the location of a logical node is updating the association of the logical node with its location. Updating the device ID of the logical node is updating the association between the logical node and the device. When the attribute value of the logical node is updated, the node update processer 23 of the device configuration management apparatus 1 updates the data of the corresponding node in the logical node information storage 31.

(3) Deletion of logical node: An existing logical node can be deleted. Deleting an existing logical node included in the network map leads to the deletion of that logical node from the network. When the logical node is deleted, the node deletion processer 24 of the device configuration management apparatus 1 deletes the data of the corresponding node in the logical node information storage 31.

Also, when information related to the logical node is displayed, the node reference processer 22 of the device configuration management apparatus 1 reads data of the corresponding node in the logical node information storage 31.

(4) Generation of device: New data corresponding to individual devices can be generated. When a device is generated, at least the device ID information is set as the information that identifies the device.

Other attribute information about a device (see FIG. 4) can be given at the time of generation of the device, or it can be set as a "null" value at the time of generation of the device. When the device is generated, the device information processer 25 of the device configuration management apparatus 1 inserts data of a new device into the device information storage 32.

(5) Updating the attribute value of device: The attribute value of an existing device can be updated. When the attribute value of the device is updated, the device information processer 25 of the device configuration management apparatus 1 updates data of the corresponding device in the device information storage 32.

(6) Delete device: It is possible to delete data of an existing device. When data of the device is deleted, the device information processer 25 of the device configuration management apparatus 1 deletes the data of the corresponding device in the device information storage 32.

Also, when information related to a device is displayed, the device information processer 25 of the device configuration management apparatus 1 reads the data of the corresponding device in the device information storage 32.

(7) Edge generation: It is possible to newly generate an edge constituting a network.

At the time of generating an edge, at least information about an edge ID is automatically given as information for identifying the edge. Other attribute information about the edge (see FIG. 5) can be given at the time of generation of the edge or it can be "null" value at the time of generation of the edge. In particular, the information about the start point node and end point node of the edge can be automatically provided by performing an operation of associating the figure of the edge with the figure of the logical node on the screen of the terminal apparatus 61. When an edge is generated, the network information processer 26 of the device configuration management apparatus 1 inserts data of a new edge into the network information storage 33.

(8) Update of edge attribute value: It is possible to update the value of attribute of an existing edge. The update of the attribute value of the edge may include the process of changing at least one of the start point node and the end point node of the edge. By changing the relationship between the figure of an edge and the figure of a logical node on the terminal apparatus 61 screen, it is possible to automatically change the information about the start point node and end point node of the edge. When the attribute value of an edge is updated, the network information processer 26 of the device configuration management apparatus 1 updates data of the corresponding edge in the network information storage 33.

(9) Delete of edge: It is possible to delete data of an existing edge. When edge data is deleted, the network information processer 26 of the device configuration management apparatus 1 deletes data of the corresponding edge in the network information storage 33.

Also, when information related to an edge, etc. is displayed, the network information processer 26 of the device configuration management apparatus 1 reads the data of the corresponding edge in the network information storage 33.

As described above, the information processer 20 of the device configuration management apparatus 1 appropriately generates, updates, or deletes data stored in the management information storage 30 according to the contents of the operation on the terminal apparatus 61. This makes possible the following.

The correspondence between a logical node and a device can be changed. That is, it is possible to update data so that a logical node corresponding to a certain device is associated with another device while the originally existing logical node is still existing.

The relationship between a logical node and a location can be changed. That is, it is possible to update data so that a corresponding logical node associated with a certain location is associated with another location while the originally existing logical node is still existing In other words, the use of the data according to the present embodiment enables the following: the relationship between a logical node and a device is not fixed but can be changed while the logical node remains, and at the same time the relationship between the logical node and the location can be changed, not fixed.

Figure 7:
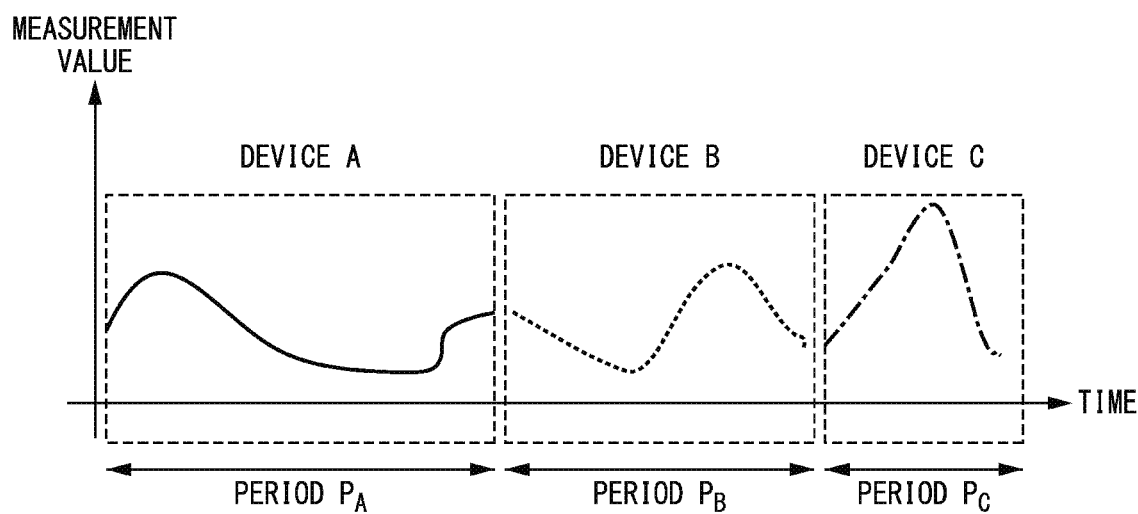
FIG. 7 is an example of a graph illustrating time series data measured in the field device managed according to the embodiment.

FIG. 7 is an example of a graph illustrating time series data measured in the field device (sensor) managed according to the present embodiment. In this graph, the vertical axis corresponds to the measured value (scalar value), and the horizontal axis corresponds to time. This graph illustrates the transition of measured values corresponding to a certain logical node N. As illustrated, the time axis (horizontal axis) includes periods $P_A$, $P_B$, and $P_C$. Each of these periods corresponds to the device associated with the logical node N.

That is, in the periods $P_A$, $P_B$, and $P_C$, the logical node N is associated with the devices A, B, and C, respectively. In other words, in each of the periods $P_A$, $P_B$, and $P_C$, the value of the item of the device ID (see FIG. 3) in the row corresponding to the logical node N in the logical node information storage 31 is the device IDs of the devices A, B, C. Also, as described above, when the value of the item of device ID in the row corresponding to the logical node N is updated, the pre-update and post-update values of each update are written to the history storage 34. Therefore, by referring to the history storage 34, it is possible to specify the device ID of the device that has been associated with the logical node N and its period. Therefore, by linking the data of measured values collected from each device in the time direction, it is possible to understand the data as illustrated in FIG. 7 and display the graph as illustrated in FIG. 7. At one point in time, the number of devices associated with a particular logical node is at most one. Also, there may be periods (e.g., between period $P_A$ and period $P_B$, between period $P_B$ and period $P_C$, etc.) where there is no device associated with a particular logical node.

In addition, in order to obtain the data illustrated in FIG. 7, data collection apparatus 72 (FIG. 2) may hold time series data for each logical node ID. In this case, the data collection apparatus 72 stores the data received from the field device 62 as time series data in association with the logical node.

Next, the cooperation between the field device 62 and the terminal apparatus 61 according to the present embodiment will be described. For example, when performing installation work, inventory check work, discard work, or the like of many field devices 62 of the same type or many similar field devices 62, the work efficiency can be improved.

Figure 8:
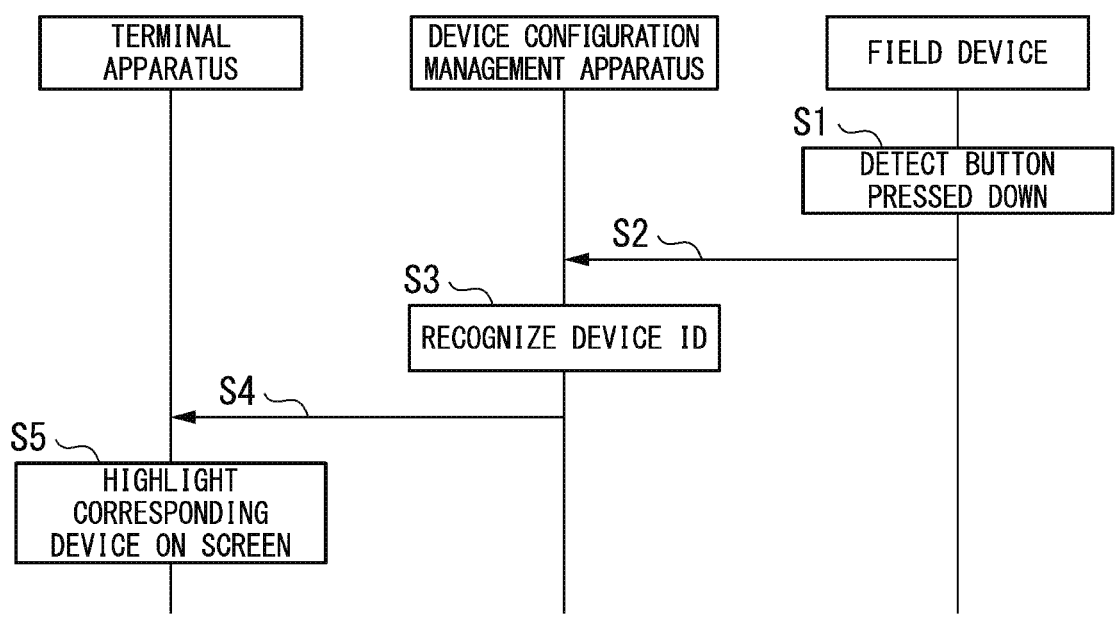
FIG. 8 is a sequence diagram illustrating a procedure of cooperation operation of the field device and the terminal apparatus according to the embodiment.

FIG. 8 is a sequence diagram illustrating a procedure of cooperation operation of the field device 62 and the terminal apparatus 61 according to the embodiment. Here, the field device 62 is provided with operation means such as a button for transmitting a predetermined signal. The procedure of cooperation operation is as follows. In step S1, the field device 62 detects that the above button has been pressed. In response to the detection of the button press, in step S2, the field device 62 transmits a signal (particular signal) indicating the button press to the device configuration management apparatus 1. This signal contains a device ID for identifying the field device 62 of the transmission source. The device configuration management apparatus receives the signal from the field device 62. In step S3, the device configuration management apparatus 1 identifies the field device 62 of the transmission source by extracting the device ID contained in the received signal. Next, the device configuration management apparatus identifies the terminal apparatus 61 in which the indication regarding the device having the device ID (for example, the indication shown in FIG. 6) is performed. There may be a plurality of corresponding terminal apparatuses 61. Then, in step S4, the user interface 41 of the device configuration management apparatus 1 transmits a signal for highlighting the information of the field device 62 of the transmission source to the identified terminal apparatus 61. The corresponding terminal apparatus 61 receives the signal transmitted from the user interface 41. Then, in step S5, the terminal apparatus 61 highlights the corresponding field device 62 (field device 62 that has detected a button press in step S1 above) on the screen. As a result, the user of the terminal apparatus 61 can easily grasp which field device 62 on the screen corresponds to the field device 62 whose button is pressed.

In the above explanation about the processing procedure, the user or the like presses the button of the field device 62, and the field device 62 is highlighted on the screen of the terminal apparatus 61. However, instead of the field device, the cooperation process with the terminal apparatus 61 may be similarly performed for any apparatus (for example, the device "Multi-tech-GW" or the device "GrandSight" shown in FIG. 6).

In the above explanation about the processing procedure, the field device 62 transmits a particular signal to the device configuration management apparatus 1 in step S2 triggered by the detection of button press by the field device 62 in step S1. However, instead of button press, the field device 62 may send a particular signal to the device configuration management apparatus 1 triggered by any other arbitrary event that the field device 62 can detect. Here, the arbitrary event is, for example, input of a command by voice, input of a command by other means, or an operation for vibrating the field device 62 itself.

the above explanation, "highlighting" means displaying with a special display attribute so that only specific objects stand out. The display with a special display attribute includes, for example, display using a distinctive color, display for making a display stand out by raising the brightness of the display for a particular target, etc., and blinking only a particular target.

Although the embodiment has been described above, the present invention can be further embodied in the following modifications.

As a modification, the device corresponding to the logical node may be fixed. In this case, once the correspondence between a logical node and a device is determined and the value of the attribute "device ID" in the logical node information storage 31 is determined, the value of the attribute "device ID" is not updated thereafter. However, in this case also, the location corresponding to the logical node can be updated any number of times as necessary.

As another modification, location corresponding to a logical node may be fixed. In this case, once the correspondence between a logical node and a location is determined, and the value of the attribute "location" in the logical node information storage 31 is determined, the value of this attribute "location" is not updated thereafter. However, in this case also, the device ID associated with the logical node can be updated any number of times as necessary.

As described above, according to the present embodiment, it is possible to manage devices etc. using logical node as a key. The logical node used as a key can continue to exist consistently, no matter whether the device has been updated or the location of the device has been changed.

In addition, at least some of the functions of the device configuration management apparatus, the terminal apparatus, the field device, the device information providing apparatus, the data collection apparatus, the gateway apparatus in the above-described embodiment can be realized by a computer In this case, programs for realizing the functions may be recorded on a computer-readable recording medium, and the program recorded on this recording medium may be read and executed by a computer system. Note that the "computer system" mentioned here includes an Operating System (OS) and hardware such as peripheral devices. In addition, the "computer-readable recording medium" refers to a portable media such as flexible disks, magneto-optical disks, ROMs, CD-ROMs, DVD-ROMs, and USB memories, and storage devices such as hard disks built into computer systems. Furthermore, the "computer-readable recording medium" is one that holds programs dynamically and temporarily, like a communication line when transmitting the program via a network such as the Internet or a communication line such as a telephone line. In that case, the "computer-readable recording medium" may include one that holds a program for a certain period of time, such as a volatile memory in the computer system that becomes a server or a client in that case. The program may be for realizing some of the functions described above, and may be a combination of the functions described above and the program already recorded in the computer system.

As mentioned above, although the embodiment (including the modification) of the present invention has been described in details with reference to the drawings, the specific configuration of the present invention is not limited to this embodiment, and designs and the like within the scope of the present invention are also included.

The present invention can be used, for example, for management of devices in industrial facilities and the like. However, the scope of use of the present invention is not limited to those exemplified here.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiment of the present invention has been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A device configuration management system comprising a device configuration management apparatus and a data collection apparatus,
    wherein the data collection apparatus is a computer that collects data transmitted from a field device,
    wherein the device configuration management apparatus comprises:
        a logical node information storage that stores logical node information about logical nodes that can be associated with the field device and a particular location, the logical node information including, for each of the logical nodes, a logical node identification (ID) for identifying the logical node, a device ID for identifying the field device, and location information which is information for identifying the particular location;
        a network information storage that stores network information as a set of information about an edge connecting two logical nodes;
        a history storage that stores a history about the logical node information stored in the logical node information storage; and
        at least one processor configured to:
            perform processing for updating at least one of the device ID and the location information with regard to a particular logical node in the logical node information stored in the logical node information storage;
            acquire a first device ID associated with a first logical node ID in the logical node information storage and a second device ID associated with the first logical node ID in the history storage; and
            acquire a first measurement value measured by a first field device identified by the first device ID and a second measurement value measured by a second field device identified by the second device ID in a case where the first field device is replaced with the second field device, and to combine the first measurement value and the second measurement value in a time axis direction, and wherein the data collection apparatus receives data used for process control from the field device and stores the data received from the field device as time series data in association with the logical node.

2. The device configuration management system according to claim 1, wherein the device configuration management apparatus further comprises a device information storage that stores device information about the field device in association with the device ID.

3. The device configuration management system according to claim 2, wherein the at least one processor of the device configuration management apparatus is further configured to execute a user interface function that provides, to an external terminal apparatus, a user interface that allows generating, updating, or deleting data stored in the logical node information storage, the network information storage, and the device information storage.

4. The device configuration management system according to claim 3, wherein when the at least one processor receives a particular signal by communication from the external field device, the at least one processor provides, to the external terminal apparatus, a user interface that highlights information about the field device which is a transmission source of the particular signal on a display screen of the external terminal apparatus.

5. The device configuration management system according to claim 2, wherein the at least one processor of the device configuration management apparatus is configured to provide
a batch interface function configured to cause the at least one processer the device configuration management apparatus to collectively update the logical node information stored in the logical node information storage,
wherein the at least one processor of the device configuration management apparatus is configured to perform processing for collectively updating the device information stored in the device information storage.

6. The device configuration management system according to claim 5, wherein the batch interface function acquires the device information about the field device from a device information providing apparatus, and causes the at least one processer of the device configuration management apparatus to perform processing for collectively updating the device information stored in the device information storage based on the acquired device information about the field device.

7. The device configuration management system according to claim 1, wherein the at least one processor of the device configuration management apparatus is configured to collectively update the logical node information stored in the logical node information storage.

8. The device configuration management system according to claim 7, wherein the at least one processor of the device configuration management apparatus is further configured to perform processing for updating the network information stored in the network information storage,
wherein the batch interface function causes the at least one processer of the device configuration management apparatus to perform processing for collectively updating the network information stored in the network information storage.

9. The device configuration management system according to claim 1, wherein the device configuration management apparatus further comprises:
a display configured to display, as a graph, the first measurement value and the second measurement value that are combined.

10. A device configuration management system comprising:
a field device configuration management apparatus;
a data collection apparatus; and
a field device,
wherein the data collection apparatus is a computer that collects data transmitted from the field device,
wherein the field device configuration management apparatus comprises:
a logical node information storage that stores logical node information about logical nodes that can be associated with the field device and a particular location, the logical node information including, for each of the logical nodes, a logical node identification (ID) for identifying the logical node, a device ID for identifying the field device, and location information which is information for identifying the particular location;
a network information storage that stores network information as a set of information about an edge connecting two logical nodes;
a history storage that stores a history about the logical node information stored in the logical node information storage; and
at least one processor configured to:
perform processing for updating at least one of the device ID and the location information with regard to a particular logical node in the logical node information stored in the logical node information storage;
acquire a first device ID associated with a first logical node ID in the logical node information storage and a second device ID associated with the first logical node ID in the history storage; and
acquire a first measurement value measured by a first field device identified by the first device ID and a second measurement value measured by a second field device identified by the second device ID in a case where the first field device is replaced with the second field device, and to combine the first measurement value and the second measurement value in a time axis direction; and
a device information storage that stores device information about the field device in association with the device ID,
wherein the at least one processor of the field device configuration management apparatus is configured to execute a user interface function that provides, to an external terminal apparatus, a user interface that allows generating, updating, or deleting data stored in the logical node information storage, the network information storage, and the device information storage,
wherein when the user interface function receives a particular signal by communication from the field device, the at least one processor provides, to the external terminal apparatus, a user interface that highlights information about the field device which is a transmission source of the particular signal on a display screen of the external terminal apparatus,
wherein when the field device detects a trigger, the field device is configured to transmit the particular signal to the user interface function of the field device configuration management apparatus, and
wherein the data collection apparatus receives data used for process control from the field device and stores the data received from the field device as time series data in association with the logical node.

11. The device configuration management system according to claim 10, wherein the field device configuration management apparatus is further configured to provide a batch interface function configured to collectively update the logical node information stored in the logical node information storage.

12. The device configuration management system according to claim 11, wherein the at least one processor of the field device configuration management apparatus is further configured to perform processing for collectively updating the device information stored in the device information storage.

13. The device configuration management system according to claim 12, further comprising a device information providing apparatus that provides the device information about the field device,
wherein the batch interface function acquires the device information about the field device from the device information providing apparatus, and causes the at least one processer to perform processing for collectively updating the device information stored in the device information storage based on the acquired device information about the field device.

14. The device configuration management system according to claim 11, wherein the at least one processor is configured to perform processing for collectively updating the network information stored in the network information storage.

15. The device configuration management system according to claim 10, wherein the field device configuration management apparatus further comprises:
a display configured to display, as a graph, the first measurement value and the second measurement value that are combined.

16. A non-transitory computer-readable recording medium storing a program which, when executed by a computer, causes the computer to at least:
perform processing for updating at least one of a device identifier (ID) and location information with regard to a particular logical node in logical node information stored in the logical node information storage that stores logical node information about logical nodes that can be associated with a field device and a particular location, the logical node information including, for each of the logical nodes, a logical node identification (ID) for identifying the logical node, a device ID for identifying the field device, and location information which is information for identifying the particular location;
acquire a first device ID associated with a first logical node ID from the logical node information storage and a second device ID associated with the first logical node ID from a history storage that stores a history about the logical node information stored in the logical node information storage; and
acquire a first measurement value measured by a first field device identified by the first device ID and a second measurement value measured by a second field device identified by the second device ID in a case where the first field device is replaced with the second field device, and to combine the first measurement value and the second measurement value in a time axis direction,
wherein a data collection apparatus receives data used for process control from the field device and stores the data received from the field device as time series data in association with the logical node.

* * * * *